United States Patent [19]

Preker

[11] Patent Number: 5,598,469
[45] Date of Patent: Jan. 28, 1997

[54] KEYPAD FOR A COMMUNICATION INSTRUMENT, PARTICULARLY A SUBSCRIBER'S INSTRUMENT FOR TELEPHONE COMMUNICATION

[75] Inventor: Friedrich Preker, Düsseldorf, Germany

[73] Assignee: Mannesmann Aktiengesellschaft, Düsseldorf, Germany

[21] Appl. No.: 559,250

[22] Filed: Nov. 15, 1995

Related U.S. Application Data

[63] Continuation of Ser. No. 344,406, Nov. 23, 1994, abandoned, which is a continuation of Ser. No. 805,089, Dec. 11, 1991, abandoned.

[30] Foreign Application Priority Data

Dec. 21, 1990 [DE] Germany ............................ 40 41 987.8

[51] Int. Cl.$^6$ ............................................ H04M 1/00
[52] U.S. Cl. ............................ 379/433; 379/434; 379/368
[58] Field of Search .................... 379/368, 369, 379/370, 434, 451, 452, 433, 447; D14/248, 247, 148, 147, 138; 341/20, 24; 400/488

[56] References Cited

U.S. PATENT DOCUMENTS

| D. 309,137 | 7/1990 | Gisser | 379/434 |
| 2,099,143 | 11/1937 | Roberts et al. | 379/368 |
| 3,483,333 | 12/1969 | Cregeen | 379/434 |
| 3,927,282 | 12/1975 | Firstenberg | 379/447 |
| 5,027,394 | 6/1991 | Ono et al. | 379/438 |

FOREIGN PATENT DOCUMENTS

| 137758 | 10/1981 | Japan | 379/368 |

OTHER PUBLICATIONS

Telephone Model: E802132, Jun. 1985.

*Primary Examiner*—Krista M. Zele
*Assistant Examiner*—Jack Chiang
*Attorney, Agent, or Firm*—Cohen, Pontani, Lieberman, Pavane

[57] ABSTRACT

A communication instrument has a housing for containing various electrical or electronic circuits and, on an operator side, a push button paid with predetermined functions being associated with the buttons. To allow the instrument to be made with a narrow form factor, yet remain functional, the keypad includes at least two parallel rows of buttons. The buttons are arranged at the smallest possible distances apart from each other which still permit reliable actuation by depressing of a button. All buttons of one row have their upper button surfaces at a greater height than all of the buttons of another row so that in each case adjacent rows of buttons form a step. A user's finger will then activate only one button of the communication instrument.

7 Claims, 1 Drawing Sheet

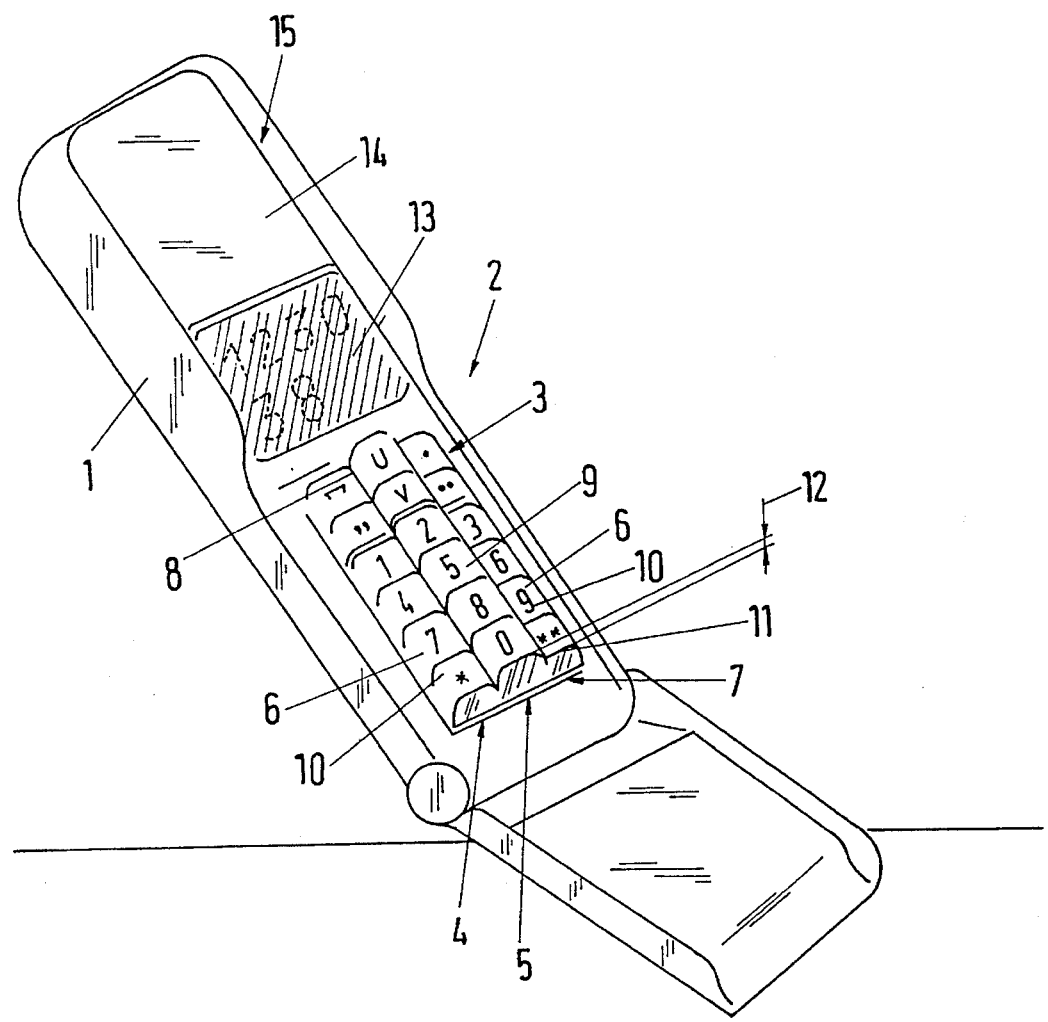

KEYPAD FOR A COMMUNICATION INSTRUMENT, PARTICULARLY A SUBSCRIBER'S INSTRUMENT FOR TELEPHONE COMMUNICATION

This is a continuation of application Ser. No.08/344,406, which is a continuation of Ser. No. 07/805,089, filed Nov. 23, 1994 and Dec. 11, 1991, now abandoned, respectively.

FIELD OF THE INVENTION

The present invention relates to a communication instrument, particularly, a subscriber's instrument for telephone communication, having a housing for containing electrical or electronic circuits which are intended for the reception, reproduction, recording and/or transmission of information, especially audio information, with a push button pad or keypad which is arranged on an operation side of the housing, and within which predetermined functions or valves are associated with the buttons.

BACKGROUND OF THE INVENTION

Instruments of the type described above are used as telephone receivers in analog and digital systems for communication. These instruments may interface with public switched telephone networks (PSTN), private branch exchanges (PBX), cellular networks, or other types of voice or data communication networks. The instrument has a number of push buttons, present as a keypad. Since such push button pads or keys not only bear the normal sequence of numbers from 0 to 9, but increasingly provided with various other functions in connection with the digitalization of the telecommunications apparatus and consequent increased functionality of the available devices, considerable enlargement of the keypad results.

It is known from VDI-Nachrichten No. 13 of Mar. 30, 1990, "The Battle is Raging with Regard to the Material", incorporated herein by reference, to provide keypads with groups of 3×4 or 3×3 buttons, in which the individual buttons are at such a distance from each other that simultaneous actuation of two buttons by the index finger appears impossible or is improbable. Such button pads, therefore, because of their layout, take up a large amount of space, which does not permit a miniaturization of the instrument. Thus, a reduction in the size of the electronic componentry of the communication instrument would not necessarily result in a smaller instrument housing due to these ergonomic constraints. Small size of mobile telecommunication instruments is particularly important because the instrument must ideally be capable of being carried with the user and placed in pockets, clothes and other constrained-size containers. Therefore, not only the electronic circuits contained within it, but also the outer dimensions of the instrument housing are to be miniaturized.

OBJECTS OF THE INVENTION

It is therefore an object of the present invention to provide a telecommunication instrument with a keypad having reduced outer dimensions, particularly in its outside width dimension.

It is also an object of the present invention to provide a keypad for a communication instrument, having a housing to receive electrical or electronic circuits for receiving and transducing audio information with an operation side, in which predetermined functions are associated with one or more buttons, comprising at least two parallel rows of buttons which are arranged immediately adjacent to one another substantially without mutual interference of operation, wherein the buttons of one of the parallel rows of buttons have upper button surfaces arranged in a plane normal to an axis of button movement higher than the buttons of another of the parallel rows of buttons, forming a step between adjacent parallel rows of buttons. The buttons have a predetermined distance of travel and a height of said step corresponds to said distance of travel.

It is another object of the present invention to provide a keypad having three parallel rows of buttons, forming two steps, wherein a central row of buttons is higher than each adjacent lateral row. The rows of buttons of the keypad are provided extending parallel to said length of the housing. The keypad comprises a plurality of adjacent rows of buttons, forming a step between each of the rows of buttons, wherein the number of steps formed is equal to one less than the number of rows.

SUMMARY OF THE INVENTION

The communication instrument of the present invention has a button pad which consists of at least two parallel rows of buttons, the buttons being arranged at the smallest possible distance apart from each other, which still permits actuation of the individual buttons by a pressure applied in a direction normal to the surface, and that all buttons of one row have their upper button surfaces in a plane which is higher along the normal direction to the key surface than all buttons of another row, so that, in each case, adjacent rows of buttons form a step. It should be noted that the surfaces of the keys need not be strictly planar, and may have a convex or concave surface, and that a row of keys need not all be at exactly the same height, and may be arranged along an incline or curve. However, it is important that along a first axis, in the length direction, of the plane or quasiplane of the surface of the keypad, the adjacent key(s) have approximately the same elevation, while along a second axis, perpendicular to the first axis, in the width direction, that the elevation of adjacent keys be different. In this way, the functionally dependent lateral distance between buttons can be reduced and thus the width of the instrument may be minimized, which thereby allows the construction of an instrument which is easier to hold and transport. Furthermore, this arrangement presents the advantage that, as a result of the difference in height of the buttons, a neighboring button is not accidentally actuated when a particular key is intended to be depressed. The present invention also presents the advantage that actuation is possible without special illumination because the step provides tactile feedback to the user, so that the instrument can be used even in poor light (or by blind persons), without the need for other tactile indicators on the keytops. The buttons can be sought and found by their immediate vicinity with reference to the step between adjacent keys, the lateral and top edges of the keypad, and possibly a tactile detectable ridge or pattern on a key or between the keys of a row.

It is preferable that the height of the step between two adjacent rows of buttons corresponds to the predetermined actuation distance or travel of the push button, along its axis of movement, which is normal to the surface of the push button. The actuating force is normally not exerted further than the point of actuation, before an adjacent button can be contacted. Thus, a double actuation of buttons is made substantially impossible under normal circumstances.

In accordance with the present invention, in the case of three parallel rows of buttons, the central row of buttons forms the higher step, with the two lateral rows forming the lower steps. Such a preferred embodiment facilitates the individual location and actuation of a button.

The arrangement of a large number of buttons can be effected, in accordance with a further feature of the invention, by providing that the rows of buttons extend parallel to the lengthwise direction of the instrument.

This step principle can also be used to provide several parallel rows of buttons, which form a number (n−1) of steps equal to one less than number of rows (n) of buttons.

Because the adjacent rows of buttons are distinguished by the step, the buttons need not be symmetrical in their length and width dimensions. Further, a central row need not have the same button dimensions as the lateral rows.

A normal telephone instrument may have a three by four key keypad, having a button spacing of 0.75 inch between button centers and a 0.375 inch square button size, to produce a keypad having a minimum size of about 1.5 inch by 2.375 inch. A keypad according to the present invention may substantially eliminate the spaces between the buttons, providing a keypad of a size smaller than about 1.125 inch by about 1.5 inch, for the same arrangement and number of keys.

BRIEF DESCRIPTION OF THE DRAWING

An embodiment of the invention is diagrammatically shown in the FIGURE in the drawing, and will be explained below in which:

The sole FIGURE of the drawing is a perspective view of a subscriber's instrument.

DETAILED DESCRIPTION OF THE PREFERRED EMBODIMENT

The communication instrument of which the present invention is a part may consist of any transportable data processing instrument, and for example, as shown in FIG. 1, of a subscriber's instrument for telephone communication.

The instrument has a housing 1, which is provided to house the electrical or electronic circuits of the device, a source of energy, such as a rechargeable battery, reception parts and transmission parts and the like, e.g. a microphone and a speaker, all of which are standard and arranged in the housing, not shown in the drawing. A keypad 3 is arranged on the operation side 2. Each of the buttons is associated with one or more predetermined functions or valves which, of course, are dependent on the stored software program and electronic hardware of the device.

The keypad 3 has at least two parallel rows 4 and 5 of buttons 6, three rows of buttons 4, 5 and 7 being present in the embodiment shown. The keypad 3 also has a number of columns, six columns being present in the illustrated embodiment. Four columns are needed to have a conventional keypad layout of the numbers. Each button 6 is arranged at the smallest possible distance 8 (scarcely visible) from the button of the neighboring row so that an actuation or button depression operation can be performed without rubbing of the adjacent buttons 6. Thus, mutual interference between the operation of the buttons is avoided. All of the buttons 6 of a row of buttons 5 have their upper button surfaces 9 arranged higher, i.e. having a height greater than all buttons 6 of the other rows of buttons 4 and 7, so that a step 11 is formed with respect to the button surfaces 10 of the lower rows of buttons 4 and 7.

The height of the step 12 between two adjacent rows 4 and 5, and 5 and 7 is set to be as much as required for functionally actuating (travel) the button 6, or possibly somewhat less than this distance, so that upon the actuating of a button 6, a normal user's finger does not reach and functionally depress an adjacent lower button. The button 6 should not travel substantially past the actuation point, so that the distance for actuation is approximately equal to the distance of travel.

As shown in the drawing, in the case of three parallel rows of buttons 4, 5 and. 7, the central row 5 forms the higher step 11.

The number of buttons can be increased in the manner that the rows of buttons 4, 5 and 7 extend parallel to the lengthwise direction of the instrument, thus increasing the area available for placement of buttons.

With the three parallel rows of buttons 4, 5 and 7 a number (n−1) of steps equal to one or less than the total number (n) of button rows 4, 5 and 7 is formed. There should generally be an odd number of rows so that the two lateral-most rows are symmetric with the same height.

The button pad 3 extends up to point on the operation side of the housing adjacent to a display 13 for the displaying of the numbers or functions keyed, and the like. The display 13 is bounded by an area 14 for the acoustic devices such as the speaker of the communication device or an enunciator (ringer) for alerting the user that a call is being received. The housing 1, furthermore, forms a protective rim 15 to protect against the incidence of light which may allow a detrimental reflection from the surface of the display 13, which may impair visibility of the display.

The buttons 6 have a curved surface, which is convex in the width direction of the instrument 1. The curvature of the buttons 6 is of such radius that there is a tactile depression between buttons in adjacent rows 4 and 5, or 5 and 7, even when the button 6 in the central row 5 is fully depressed. This provides a tactile differentiation between the rows, so that the user may avoid inadvertently activating more than one key, or the wrong key.

It should be understood that the preferred embodiments and examples described are for illustrative purposes only and are not to be construed as limiting the scope of the present invention which is properly delineated only in the appended claims.

What is claimed is:

1. A keypad for a hand held telephone communication instrument for receiving and transducing audio information and including a housing having a surface from which the keypad outwardly projects, said keypad comprising:

a plurality of push buttons each projecting outwardly from the housing surface and inwardly depressible toward the housing surface from an undepressed condition to a depressed condition by a user of the instrument for operating said each push button;

said plural push buttons being arranged in three separate and distinct, parallel, non-overlapping rows comprising a first row, a second row and a third row located between said first and second rows and defining across said first, second and third rows a width of the keypad;

each said push button comprising an upper button surface disposed at a first distance from the housing surface in said undepressed condition and at a second distance from the housing surface in said depressed condition of the said each push button;

said push buttons of said third row being disposed in immediately confronting adjacency and in substantial edge-to-edge abutment to said push buttons of each of said first and second rows so as to minimize the width of the keypad and such that the push buttons of each said row are disposed substantially without intervening space between said push buttons of said each row and the push buttons of an immediately adjacent one of said rows and such that each said push button of each said row is independently movable between said undepressed and depressed conditions without interference with the push buttons of an immediately adjacent one of said rows;

the upper surface of each said push button of said first and second rows; being spaced from the housing surface by a first height in said undepressed condition, and the upper surface of each said push button of said third row being spaced from the housing surface by a second height greater than said first height in said undepressed condition.

2. A keypad for a hand held telephone communication instrument in accordance with claim 1, wherein the upper surface of each of said push buttons of said third row is spaced from the housing surface in said depressed condition by at least said first height so that user operation of said each push button of said third row by moving said each push button of said third row from said undepressed to said depressed condition cannot unintendedly result in operation of an immediately-adjacent push button of at least one of said first and second rows.

3. A keypad for a hand held telephone communication instrument in accordance with claim 1, wherein each of said first, second and third rows defines a row axis along which the push buttons of said each row are arranged, and wherein each push button of each said row is aligned with a push button of an adjacent row so that the push button of said each row and the aligned push button of said adjacent row are arranged on a common axis oriented substantially perpendicular to said row axes.

4. A keypad for a hand held telephone communication instrument in accordance with claim 1, wherein the upper button surface of each of said push buttons of said first, second and third rows is similarly dimensioned.

5. A keypad for a hand held telephone communication instrument in accordance with claim 1, wherein the upper button surface of each of said push buttons of said first, second and third rows is similarly configured.

6. A keypad for a hand held telephone communication instrument in accordance with claim 1, wherein the upper button surface of each of said push buttons of said first, second and third rows is similarly configured and dimensioned.

7. A keypad for a hand held telephone communication instrument in accordance with claim 1 wherein the housing is elongated along a length of the housing greater than a width of the housing, each of said first, second and third rows of push buttons being oriented so as to extend along the elongated length of the housing.

* * * * *